Nov. 24, 1959  V. L. SMITH ET AL  2,914,697
TIME CALIBRATED OSCILLOSCOPE SWEEP CIRCUIT
Filed April 8, 1959
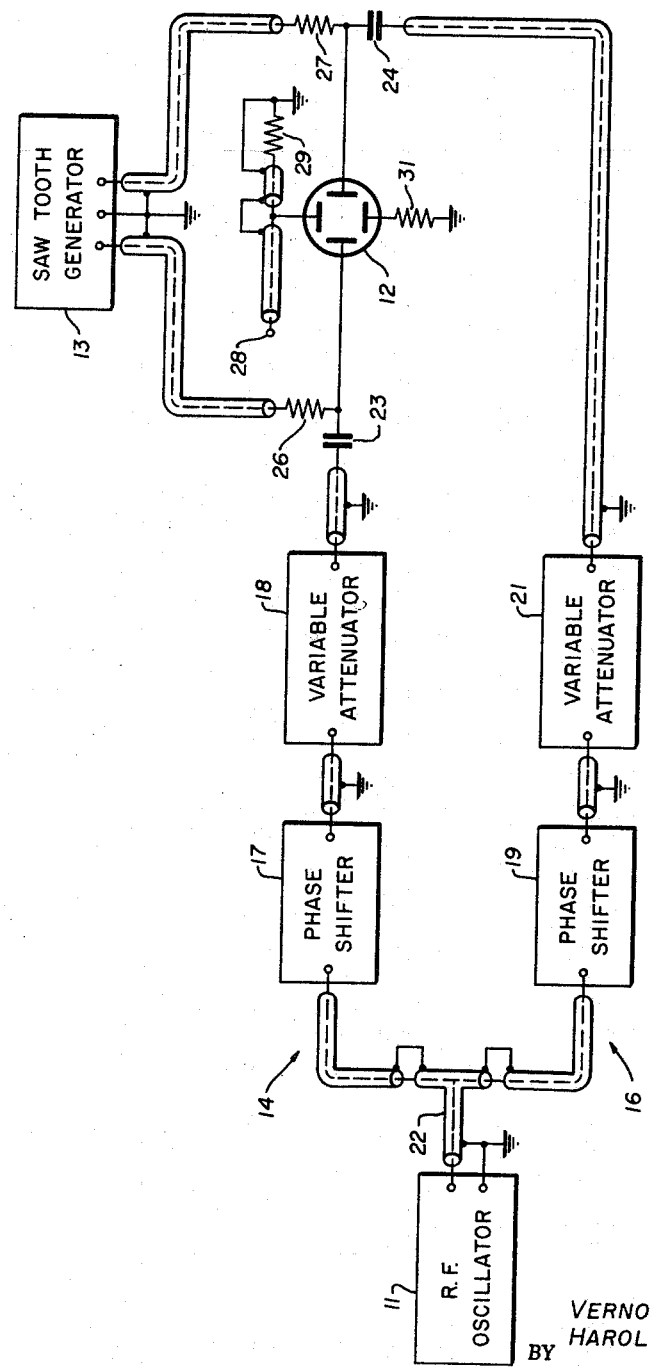
INVENTORS.
VERNON L. SMITH
HAROLD K. CARSTENSEN
BY
ATTORNEY.

2,914,697

TIME CALIBRATED OSCILLOSCOPE SWEEP CIRCUIT

Vernon L. Smith and Harold K. Carstensen, Livermore, Calif., assignors to the United States of America as represented by the United States Atomic Energy Commission Application April 8, 1959, Serial No. 805,106

4 Claims. (Cl. 315—26)

The present invention relates generally to time calibrated oscilloscopic displays of rapidly occurring phenomena and more particularly, to an improved time calibrated sweet circuit which extends the range of usefulness of conventional oscilloscopes as utilized for time calibrated display applications.

A variety of means have been employed in the time calibration of fast rising signals and various short-lived events as displayed upon the viewing screen of a cathode ray oscilloscope. One particularly advantageous means which superimposes discernable equal time interval indications directly upon the displayed signal is disclosed in U.S. Patent No. 2,832,002 which issued to H. M. Owren et al. on April 22, 1958. Briefly the foregoing patent discloses time calibrated oscilloscope sweep means wherein a high frequency sinusoidal signal is superimposed upon a conventional linear saw-tooth sweep signal applied to the horizontal deflection plates of a cathode ray oscilloscope. The frequency and amplitude of the high frequency signal are appropriately adjusted relative to the rate of rise of the saw-tooth signal such that a series of intensified spots or discernible cyclic variations of equal time separation equal to the period of the high frequency signal appear directly superimposed upon a displayed signal. The spots or variations may accordingly be readily counted to determine the time separation between various events or points of the displayed signal.

In order to provide a high time resolution in the calibration of extremely rapid phenomena, e.g., a substantially vertically rising signal, with the foregoing patented device, the high frequency calibration oscillator must be adjusted to extremely high frequencies of the order of 50 to 1000 mc. to provide a sufficient number of extremely short calibrating indications over the time duration of the displayed signal. The upper frequency limit of the high frequency calibration oscillations which may be satisfactorily employed with conventional oscilloscope cathode ray tubes, however, is of the order of 100–200 mc. More particularly, at frequencies above this upper limit, the interelectrode capacitances that inherently exist between the horizontal and vertical deflection plates of the cathode ray tube produce significant "feedthrough" or coupling effects between such deflection plates. The high frequency sinusoidal component in the calibrated sweep signal applied to the horizontal deflection plates is coupled by the interelectrode capacitances to the vertical deflection plates, thus producing an extraneous feedthrough signal thereon. Such feedthrough signal consequently causes irregularities to appear in the normal time calibrated display of a signal to be observed applied to the vertical deflection plates. These irregularities are usually distortions of the displayed signal in both phase and amplitude which result in a smearing of the superimposed calibration dots in an elliptical fashion, as well as various undesirable imperfections in the cyclic calibration variations to the extent that the calibration indications are rendered unreliable, if not completely useless, as a precise time calibration. The time calibrated sweep means of the previously referenced patent is hence limited in utility by the inherent interelectrode capacitive coupling effects of conventional cathode ray tubes to time calibration applications where calibrating time intervals corresponding to oscillator frequencies of less than about 100 mc. suffice.

Therefore, it is an object of the present invention to materially extend the useable calibration oscillator frequency range in time calibrated sweep apparatus of the class referenced hereinbefore.

Another object of the invention is to provide an improved time calibrated sweep circuit having means for compensating the undesirable effects of capacitative feedthrough currents produced in conventional cathode ray tubes at extremely high calibration oscillator frequencies to thereby eliminate imperfections in the resulting time calibrated signal display.

Still another object of the present invention is the provision of improved viewing tube frequency response in a cathode ray oscilloscope employing a time calibrated sweep of the previously indicated type.

A further object of the invention is to provide means for calibrating extremely rapid and fast rising signals relative to time with extreme accuracy.

A still further object of this invention contemplates the use of calibration oscillator frequencies of the order of 1000 mc. in time calibrated sweep circuits employed in conventional cathode ray oscilloscopes.

The invention, both as to its organization and method of operation, together with further objects and advantages thereof, will best be understood by reference to the following specification taken in conjunction with the accompanying drawing of which the single figure is a block diagram of a preferred embodiment of an improved time calibrated sweep circuit in accordance with the present invention.

Considering now the invention in some detail and referring to the illustrated form thereof in the drawing, there is generally provided a variable radio frequency calibration oscillator 11 which is appropriately coupled to the horizontal deflection plates of cathode ray tube 12 of a conventional oscilloscope, such horizontal deflection plates being also coupled to the output of a linear saw-tooth sweep voltage generator 13. The sinusoidal output voltage from calibration oscillator 11, moreover, is appropriately adjusted relative to the saw-tooth output voltage from sweep generator 13 to produce at the horizontal plates of cathode ray tube 12 a resultant time calibrated sweep deflection voltage of the character disclosed in the Owren et al. patent of previous mention. More specifically, in accordance with the teachings of such patent as hereby incorporated by reference in the present disclosure, the amplitude, $E_2$, and angular frequency, $\omega$, of the sinusoidal voltage are adjusted relative to the linear voltage rise per unit of time, $E_1$, of the saw-tooth voltage such that the ratio, $E_2/E_1$, is at least $1/\omega$ and the resultant time calibrated sweep deflection voltage, $E$, is thereby of the form:

$$E = E_1 t + \frac{E_1}{\omega} \sin \omega t$$

With such a time calibrated sweep deflection voltage at the horizontal deflection plates of cathode ray tube 12, a signal applied to the vertical deflection plates is displayed upon the viewing screen of the tube with a directly superimposed time calibration. The time calibration is in the form of spaced intensified dots superimposed upon substantially constant valued portions of the display and minute cyclic sinusoidal-like variations superimposed upon the varying portions of the display. The spacing between adjacent dots, and each cycle of the cyclic variations are respectively indicative of time increments equal the period of the sinusoidal output voltage of calibration oscillator 11. As previously mentioned, it has been found that the foregoing superimposed indications become progressively too distorted for reliable, accurate calibration purposes at frequencies of calibration oscillator 11 above about 100 mc., due to inherent interelectrode capacitive feedthrough between the horizontal and vertical deflection plates of the cathode ray tube 12 at such elevated frequencies. The particular coupling arrangement between the oscillator 11, saw-tooth generator 13, and cathode ray tube 12 provided by the present invention as depicted in the drawing and hereinafter described, provides a solution to the foregoing problem by compensating the feedthrough effect and thereby extending the useable calibration frequency range of the time calibrated sweep circuit in accordance with the previously referenced patent to calibration frequencies of the order of 1000 mc.

Considering now in detail the improved coupling circuit of the present invention which facilitates direct time calibration in the foregoing manner of extremely short or fast rising displayed signals, it is to be noted that the output of radio frequency calibration oscillator 11 is coupled through two independently adjustable signal paths 14, 16 to the opposite horizontal deflection plates of cathode ray tube 12. Signal paths 14, 16 are substantially identical, path 14 including a variable phase shifter 17 serially connected to a variable attenuator 18, and path 16 including a second variable phase shifter 19 and second variable attenuator 21 serially connected thereto. Inasmuch as calibration oscillator 11 is preferably capable of generating sinusoidal oscillations at frequencies up to at least 1000 mc., high frequency coupling means, such as coaxial cables, are employed throughout in the interconnections of the various elements of signal paths 14, 16. Similarly, to commonly couple the output of calibration oscillator 11 to the signal paths 14, 16, a coaxial T 22 or equivalent means is connected between the oscillator output and the coaxial cables to the phase shifters 17, 19, respectively. To complete the signal paths 14, 16, the output coaxial cables from attenuators 18, 21 are coupled by blocking capacitors 23, 24 to the horizontal deflection plates of cathode ray tube 12, with the capacitor leads being made as short as possible to effectively minimize losses and undesirable electrical interferences.

Saw-tooth sweep generator 13 is preferably symmetrically coupled to both horizontal deflection plates of cathode ray tube 12, as opposed to the more conventional unsymmetrical connection to one plate while coupling the other plate to ground. To accomplish the foregoing, positive and negative output terminals of saw-tooth generator 13 are respectively coupled as by means of coaxial cables or other suitable high frequency transmission line means to the horizontal deflection plates of the cathode ray tube. In addition, isolation resistors 26, 27 are preferably respectively connected between the ends of the cables and the horizontal deflection plates to block the high frequency signal and allow the transmission of the saw-tooth generator voltage. The resistors 26, 27 effectively prevent the high frequency oscillations from radio frequency calibration oscillator 11 as applied to the cathode ray tube horizontal deflection plates from appearing in the saw-tooth generator circuitry. Similarly, the blocking capacitors 23, 24 of previous mention substantially prevent the saw-tooth sweep signal from being coupled through signal paths 14, 16 and undesirably appearing in the calibration oscillator circuitry.

In order that input signals to be displayed may be conveniently applied to the oscilloscope cathode ray tube 12, a suitable input signal coaxial terminal 28 is provided coupled to the vertical deflection plates of such tube. By virtue of the fast rising or short-lived characteristics of the signals with which the present invention may be utilized to great advantage, high frequency coupling means such as a coaxial cable is employed to connect terminal 28 to one vertical deflection plate. The coaxial cable is terminated in the conventional manner in an impedance matching section 29 to eliminate undesirable reflections and distortions along such cable. The other vertical deflection plate is connected through a load resistor 31 to ground with the lead from the deflection plate to the resistor being made as short as possible to minimize losses and interference. Hence, fast rising or short-lived signals applied to coaxial input terminal 28 are displayed upon the screen of cathode ray tube 12 with a minimum of distortion and such signals may be reliably calibrated relative to time by virtue of the improved time calibrated sweep circuit of the present invention.

To calibrate a signal applied to input terminal 28, the amplitude and frequency of the output from radio frequency calibration oscillator 11 are first adjusted relative to the voltage rise per unit of time of the sawtooth signal from sweep generator 13 according to the relations disclosed by the Owren et al. patent of previous mention. More particularly, the amplitude of the calibration oscillator signal is adjusted to at least, $E_1/\omega$, $E_1$ being the sawtooth voltage rise per unit of time and $\omega$ being the angular frequency of the calibration signal. As a result of the foregoing, the calibration dots and/or cyclic variations are directly superimposed upon the displayed signal and may be employed for time calibration purposes in the manner described in the referenced patent. When the angular frequency, $\omega$, corresponds to extremely high frequencies (e.g., frequencies of several hundred megacycles), however, the calibration dots and cyclic variations are usually smeared or otherwise distorted as previously mentioned by virtue of the high frequency capacitive feedthrough between the horizontal and vertical deflection plates of the cathode ray tube 12. In some instances, merely as a result of the two high frequency signal paths 14, 16 of the present invention and exactly balanced reactance conditions existing between the horizontal and vertical deflection plates of the cathode ray tube, the high frequency feedthrough signals capacitively coupled to the vertical deflection plates from one horizontal deflection plate are fortuitously exactly opposite in amplitude and phase to the feedthrough signals similarly coupled to the vertical deflection plates from the other horizontal deflection plate. Under the foregoing circumstances, the feedthrough signals cancel and there is accordingly no distortion of the superimposed time calibrations.

As is more often the case, however, the high frequency feedthrough signals coupled to the vertical deflection plates from one horizontal deflection plate differ in amplitude and phase from the feedthrough signals coupled from the other horizontal deflection plate due to an inherent unbalance in the internal coupling reactances between the various deflection plates. In accordance with the improved circuit of the present invention, the phase shifters 17, 19 and attenuators 18, 21 are independently varied until the feedthrough signals are nulled to zero as indicated by the elimination of distortion from the superimposed calibration indications on the displayed signal. The foregoing action occurs by virtue of the independent variation in the phase and amplitude of the calibration oscillator signals applied to each horizontal deflection plate as facilitated by the separately adjustable signal paths 14, 16 thereto in accordance with the present invention. The effected variations in amplitude and phase of the calibration signals at the horizontal deflection plates are similarly extended to the feedthrough signals at the vertical plates. Hence, it is readily apparent that the signal at one horizontal plate may be varied by adjustment of, for example, phase shifter 17 and attenuator 18, until the corresponding feedthrough signals at the vertical plates are exactly opposite in amplitude and phase to the feedthrough signals from the other horizontal plate resulting from a signal thereat due to a particular setting of phase shifter 19 and attenuator 21, and vice versa.

The particular requisite settings of phase shifters 17, 19 and attenuators 18, 21 to eliminate distortion at a particular calibration frequency with a particular cathode ray tube in which the interelectrode capacitive reactances are accurately known at such calibration frequency, may be determined through a rigorous mathematical analysis. However, such analysis is not presented herein inasmuch as in actual practice the phase shifters and attenuators are adjusted by trial and error until distortion is eliminated as indicated by direct observation of the calibration dots appearing on the displayed sweep trace with zero signal applied to input terminal 28. In the foregoing manner, the present invention hence extends the useable range of time calibrated oscilloscope sweeps employed with conventional oscilloscope cathode ray tubes to calibration oscillator frequencies of the order of hundreds of megacycles.

While the invention has been disclosed with respect to a single preferred embodiment, it will be apparent to those skilled in the art that numerous variations and modifications may be made within the spirit and scope of the invention and thus it is not intended to limit the invention except as defined in the following claims.

What is claimed is:

1. In a time calibrated sweep circuit of the type having a linear saw-tooth generator and a sinusoidal calibration oscillator coupled to the output of said saw-tooth generator with the amplitude of the signal from the calibration oscillator being at least, $E_1/\omega$, where $E_1$ is the linear voltage rise per unit of time of the signal from the saw-tooth generator and $\omega$ is the angular frequency of the calibration oscillator, the improvement comprising a pair of independent signal paths connecting said calibration oscillator to the output of said saw-tooth generator, a variable phase shifter in each path, and a variable attenuator in each path serially connected to the phase shifter therein, each one of said signal paths being thereby phase and amplitude adjustable to separately vary the amplitude and phase of the two calibration oscillator signals coupled through said paths for combination with said saw-tooth signal and respective application to the horizontal deflection plates of an oscilloscope cathode ray tube.

2. In a time calibrated oscilloscope circuit including at least a cathode ray tube having vertical and horizontal deflection plates, said vertical deflection plates coupled to terminals for receiving short-lived signals, a linear saw-tooth generator coupled to said horizontal deflection plates, and a radio frequency calibration oscillator coupled to said horizontal deflection plates with the amplitude of the signal from said calibration oscillator being at least $E_1/\omega$, where $E_1$ is the linear voltage rise per unit of time of the signal from said saw-tooth generator and, $\omega$, is the angular frequency of the signal from said calibration oscillator, the improvement comprising high frequency connection means separately coupling a positive voltage terminal of said saw-tooth generator to one of said horizontal deflection plates and a negative voltage terminal of said saw-tooth generator to the other of said horizontal deflection plates, and a pair of independent high frequency signal paths commonly coupling the output of said calibration oscillator respectively to said horizontal deflection plates, each one of said signal paths including a variable phase shifter and variable attenuator connected in series for separately adjusting the amplitude and phase of the radio frequency calibration oscillator signal at each one of said horizontal deflection plates to balance feedthrough currents capacitively coupled from each horizontal deflection plate to said vertical deflection plates to zero.

3. An improved time calibrated oscilloscope sweep circuit comprising an oscilloscope having at least a cathode ray tube with horizontal and vertical deflection plates, a variable amplitude and frequency radio frequency calibration oscillator, first and second variable phase shifters commonly coupled to the output of said oscillator, first and second variable attenuators respectively serially coupled to said phase shifters, first and second blocking capacitors respectively coupling said attenuators to said horizontal deflection plates, a linear saw-tooth sweep generator having positive and negative output terminals relative to ground, first and second conductor means respectively connected to said positive and negative terminals, a pair of isolation resistors respectively coupling said first and second conductor means to said horizontal deflection plates, and signal input terminal means coupled to said vertical deflection plates, said calibration oscillator being adjusted in amplitude and frequency to maintain, $E_2/E_1$ in a fixed ratio of at least $1/\omega$, where $E_2$ is the amplitude of the signal from said calibration oscillator, $\omega$ is the angular frequency thereof, and $E_1$ is the linear voltage rise per unit of time of the signal from said saw-tooth generator.

4. In an improved time calibrated oscilloscope for extremely fast rising and short-lived signal applications, the combination comprising a cathode ray tube including at least horizontal and vertical deflection plates, a high frequency transmission line terminated in a matching impedance connected to one of said vertical deflection plates, signal input terminal means connected to said transmission line, a load resistor connected between the other of said vertical deflection plates and ground, a linear saw-tooth generator having positive and negative terminals relative to ground and producing a voltage characterized by $E_1 t$ where $E_1$ denotes the linear voltage rise per unit of time, $t$, a pair of high frequency transmission lines connected to said positive and negative terminals, a pair of isolation resistors respectively connected between the ends of said transmission lines and said horizontal deflection plates, a variable amplitude and frequency radio frequency calibration oscillator producing a voltage characterized by $E_2 \sin \omega t$ where $E_2$ is a constant denoting peak voltage amplitude and $\omega$ is a constant denoting electrical angular frequency, said calibration oscillator adjusted in amplitude and frequency to maintain $E_2/E_1$ in a fixed ratio of at least $1/\omega$, a pair of variable phase shifters, a high frequency T coupler having its leg connected to the output of said calibration oscillator, high frequency transmission line means connecting the arms of said T coupler respectively to said pair of phase shifters, a pair of variable attenuators, high frequency transmission line means respectively connecting said pair of attenuators in series with said pair of phase shifters, a pair of blocking capacitors respectively connected to said horizontal deflection plates, and transmission line means respectively connecting said attenuators in series with said pair of blocking capacitors, said calibration oscillator and said saw-tooth generator producing a resultant time calibrated sweep voltage between said horizontal deflection plates characterized by:

$$E_1 t + E_2 \sin \omega t$$

where $E_2$ is at least $E_1/\omega$, said phase shifters and attenuators adjusted to cancel feedthrough currents internally capacitively coupled to said vertical deflection plates from each of said horizontal deflection plates at said angular frequency, $\omega$, of said calibration oscillator.

References Cited in the file of this patent

UNITED STATES PATENTS 2,832,002   Owren et al. _____ Apr. 22, 1958